US 8,285,920 B2

(12) United States Patent
Mylly

(10) Patent No.: US 8,285,920 B2
(45) Date of Patent: Oct. 9, 2012

(54) MEMORY DEVICE WITH DYNAMIC CONTROLLABLE PHYSICAL LOGICAL MAPPING TABLE LOADING

(75) Inventor: Kimmo J. Mylly, Ylojarvi (FI)

(73) Assignee: Nokia Corporation, Espoo (FI)

( * ) Notice: Subject to any disclaimer, the term of this patent is extended or adjusted under 35 U.S.C. 154(b) by 313 days.

(21) Appl. No.: 12/803,899

(22) Filed: Jul. 9, 2010

(65) Prior Publication Data

US 2012/0011299 A1 Jan. 12, 2012

(51) Int. Cl.
*G06F 12/00* (2006.01)
(52) U.S. Cl. ...................................................... 711/103
(58) Field of Classification Search ........................ None
See application file for complete search history.

(56) References Cited

U.S. PATENT DOCUMENTS

| 6,460,111 | B1 * | 10/2002 | Shinohara ..................... 711/103 |
| 6,633,956 | B1 | 10/2003 | Mitani |
| 7,596,655 | B2 | 9/2009 | Wang et al. |
| 7,610,464 | B2 * | 10/2009 | Otsuka .......................... 711/163 |
| 7,644,251 | B2 | 1/2010 | Sanders et al. |
| 2006/0179212 | A1 | 8/2006 | Kim et al. |
| 2007/0208885 | A1 * | 9/2007 | Otsuka ........................... 710/22 |
| 2008/0195802 | A1 | 8/2008 | Lee et al. |

FOREIGN PATENT DOCUMENTS

| EP | 0 533 190 B1 | 4/1996 |
| JP | 11-126161 A | 5/1999 |

OTHER PUBLICATIONS

"A flash driver algorithm minimizing block erasures", Tae-Sun Chung et al., Journal of Systems Architecture: the EUROMICRO Journal, vol. 53, Issue 12 (Dec. 2007), pp. 889-901.
"A NAND Flash Memory Controller for SD/MMC Flash Memory Card", Chuan-Sheng Lin et al., IEEE Transactions on Magnetics, vol. 43, No. 2, Feb. 2007, pp. 933-935.
Embedded MultiMediaCard (eMMC) Product Standard, High Capacity, JESD84-A42, Jun. 2007, JEDEC Solid State Technology Association.

* cited by examiner

*Primary Examiner* — Hiep Nguyen
(74) *Attorney, Agent, or Firm* — Harrington & Smith

(57) ABSTRACT

An apparatus includes a processor and a memory that includes computer program code. The memory and the computer program code are configured to, with the processor, cause the apparatus at least to send information from a host device to a mass storage memory device that is connected with the host device, the information including an indication of at least one default logical address range for a mass memory of the mass storage memory device. The memory and the computer program code are further configured, with the processor, to cause the apparatus, during operation of the host device with the mass storage memory device, and in response to at least one trigger condition being satisfied, to initiate a load of a portion of a logical-physical address conversion table that is stored in a memory of the mass storage memory device to another memory of the mass storage memory device as a local logical-physical address conversion table, where the portion corresponds to the at least one default logical address range. Also disclosed are corresponding methods and computer-readable storage medium, as well as a mass memory device or module that operates and is constructed in accordance with the exemplary embodiments of this invention.

31 Claims, 5 Drawing Sheets

MEMORY DEVICE WITH DYNAMIC CONTROLLABLE PHYSICAL LOGICAL MAPPING TABLE LOADING

TECHNICAL FIELD

The exemplary and non-limiting embodiments of this invention relate generally to data storage systems, methods, devices and computer programs and, more specifically, relate to mass memory devices, such as those containing non-volatile flash memory.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

Various abbreviations that appear in the ensuing description and/or drawing figures are defined as follows:
eMMC embedded MultiMediaCard
JEDEC joint electronic device engineering council
SD secure digital (memory card)
SDA secure digital association
SRAM static random access memory
SSD solid state disk
UFS universal flash storage (JEDEC next generation mass memory definition post-eMMC)

Different types of flash-based managed mass storage memories currently exist. A basic premise of such mass storage memory is to hide the flash technology complexity from the host system. A technology such as eMMC is one non-limiting example.

FIG. 1A reproduces FIG. 2 from JEDEC Standard, Embedded MultiMediaCard (eMMC) Product Standard, High Capacity, JESD84-A42, June 2007, JEDEC Solid State Technology Association, and shows a functional block diagram of an eMMC. The JEDEC eMMC includes, in addition to the flash memory itself, an intelligent on-board controller that manages the MMC communication protocol. The controller also handles block-management functions such as logical block allocation and wear leveling. The interface includes a clock (CLK) input. Also included is a command (CMD), which is a bidirectional command channel used for device initialization and command transfers. Commands are sent from a bus master to the device, and responses are sent from the device to the host. Also included is a bidirectional data bus (DAT[7:0]). The DAT signals operate in push-pull mode. By default, after power-up or RESET, only DAT0 is used for data transfer. The memory controller can configure a wider data bus for data transfer using either DAT[3:0] (4 bit mode) or DAT[7:0] (8 bit mode).

One non-limiting example of a flash memory controller construction is described in "A NAND Flash Memory Controller for SD/MMC Flash Memory Card", Chuan-Sheng Lin and Lan-Rong Dung, IEEE Transactions of Magnetics, Vol. 43, No. 2, February 2007, pp. 933-935 (hereafter referred to as Lin et al.). FIG. 1B herein reproduces Figure 1 of Lin et al., and shows an overall block diagram of the NAND flash controller architecture for a SD/MMC card. The particular controller illustrated happens to use a w-bit parallel Bose-Chaudhuri-Hocquengham (BCH) error-correction code (ECC) designed to correct random bit errors of the flash memory, in conjunction with a code-banking mechanism. The controller contains various RAMs, e.g., buffer RAM, bank RAM and common RAM.

In a NAND-flash device, as opposed to a NOR-flash device where cells are connected in parallel, the individual cells are connected in series in a manner that resembles a NAND gate. The series connection prevents the cells from being programmed individually. The cells are read out in series.

The eMMC/SD/UFS type of so-called managed NAND devices include the controller that manages the flash (NAND) memory. Typically these devices (controllers) include some embedded SRAM to store device metadata such as a physical-logical address conversion table or a portion of the physical-logical address conversion table. To minimize the size of the conversion table a block mapping scheme can be used. While the use of a page mapping scheme could be more efficient for certain use cases, the size of the resulting physical-logical address conversion table would increase significantly. However, even with the use of block mapping the physical-logical address conversion table typically does not fit fully into the SRAM due to, for example, cost optimization considerations of the controller/device. The resulting requirement to transfer, during use, portions of the physical-logical address conversion table to and from the flash memory results in slower device operation.

A portion of the physical-logical address conversion table can be loaded based on address information in a received memory access command. For example, reference can be made to Tae-Sun Chung, Hyung-Seok Park, "STAFF: A flash driver algorithm minimizing block erasures", Journal of Systems Architecture: the EUROMICRO Journal, Vol. 53, Issue 12 (December 2007), pp. 889-901.

In high end applications (such as portable computer applications) there are typically sufficient resources and memory so that the entire physical-logical address conversion table can be accommodated.

Lee et al. in US 2008/0195802 A1, "System and Method for Searching Mapping Table of Flash Memory", describe the use of two random access memories, specifically a fast SRAM and a slower DRAM, for storing the flash mapping table. In FIG. 7 of Lee et al. there is shown an example of dividing and loading mapping table data according to importance, size, and search frequency. In this approach first mapping table data, e.g., page mapping table data, having a higher importance, smaller size, or higher search frequency among the entire mapping table data is loaded into the SRAM, while second mapping table data, e.g., bad-block mapping table data and logical-to-physical mapping table data, having lower importance, larger size, or lower search frequency is loaded into the slower DRAM.

One clear disadvantage of this approach is that two memories are needed in the flash controller for storing the mapping table data.

SUMMARY

The foregoing and other problems are overcome, and other advantages are realized, by the use and practice of the exemplary embodiments of this invention.

In a first aspect thereof the exemplary embodiments of this invention include a method that comprises sending information from a host device to a mass storage memory device that is connected with the host device, the information comprising an indication of at least one default logical address range for a mass memory of the mass storage memory device. The method further comprises, during operation of the host device with the mass storage memory device, and in response to at least one trigger condition being satisfied, initiating a load of a portion of a logical-physical address conversion table that is stored in a memory of the mass storage memory device to another memory of the mass storage memory device as a local logical-physical address conversion table, where the portion corresponds to the at least one default logical address range.

In another aspect thereof the exemplary embodiments of this invention include an apparatus that comprises a processor and a memory that includes computer program code. The memory and the computer program code are configured to, with the processor, cause the apparatus at least to send information from a host device to a mass storage memory device that is connected with the host device, the information comprising an indication of at least one default logical address range for a mass memory of the mass storage memory device. The memory and the computer program code are further configured to, with the processor, cause the apparatus, during operation of the host device with the mass storage memory device, and in response to at least one trigger condition being satisfied, to initiate a load of a portion of a logical-physical address conversion table that is stored in a memory of the mass storage memory device to another memory of the mass storage memory device as a local logical-physical address conversion table, where the portion corresponds to the at least one default logical address range.

In another aspect thereof the exemplary embodiments of this invention include a method that comprises, during operation of a mass storage memory device, detecting at least one trigger condition being satisfied and, in response, initiating a load of a portion of a logical-physical address conversion table that is stored in a memory of the mass storage memory device to another memory of the mass storage memory device as a local logical-physical address conversion table, where the portion corresponds to at least one default logical address range.

In another aspect thereof the exemplary embodiments of this invention include an apparatus that comprises a processor and a memory that includes computer program code. The memory and the computer program code are configured to, with the processor, cause the apparatus at least to, during operation of the mass storage memory device, and in response to at least one trigger condition being satisfied, initiate a load of a portion of a logical-physical address conversion table that is stored in a memory of the mass storage memory device to another memory of the mass storage memory device as a local logical-physical address conversion table, where the portion corresponds to at least one default logical address range.

BRIEF DESCRIPTION OF THE DRAWINGS

The foregoing and other aspects of the embodiments of this invention are made more evident in the following Detailed Description, when read in conjunction with the attached Drawing Figures, wherein.

DETAILED DESCRIPTION

The use of the exemplary embodiments of this invention improves the probability that a correct portion of a flash device physical-logical address conversion table is stored in a random access memory, such as SRAM, and thus a next access to the flash device, can be accomplished with minimal delay.

When a mass storage memory is used in a high volume consumer device, such as a mobile wireless communication device, one important consideration is cost, and one factor affecting the cost is the amount of RAM in the mass storage memory device itself.

Another important consideration is performance. The overall performance depends on many factors. For example, to increase access speed, such as operations involving the physical-logical address conversion table, there would be an advantage to include a substantial amount of RAM in the mass storage memory device. However, this can have a negative impact on the cost.

Figure 1A:
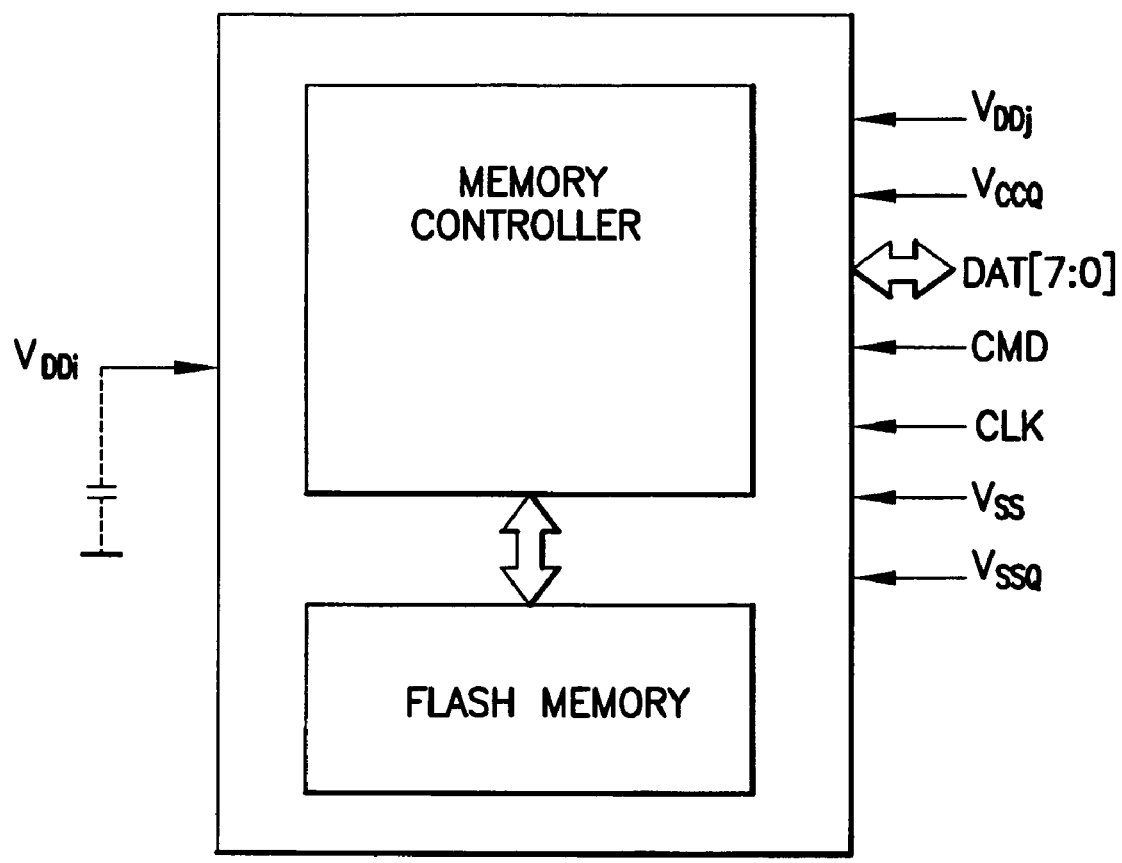
FIG. 1A reproduces FIG. 2 from JEDEC Standard, Embedded MultiMediaCard (eMMC) Product Standard, High Capacity, JESD84-A42, June 2007, JEDEC Solid State Technology Association, and shows a functional block diagram of an eMMC.
Figure 1B:
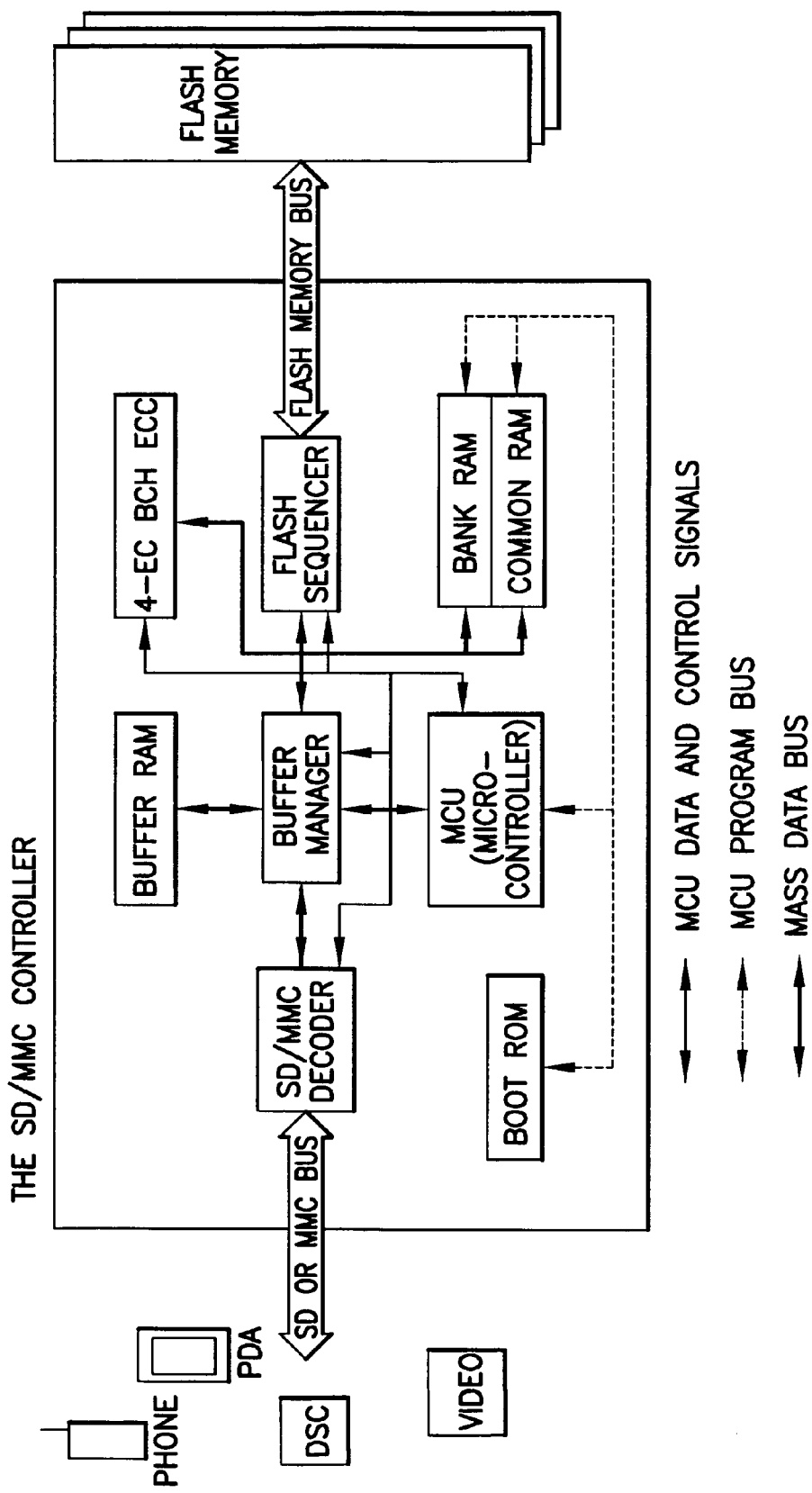
FIG. 1B reproduces FIG. 1 of Lin et al., and shows an overall block diagram of an example of a NAND flash controller architecture for a SD/MMC card.
Figure 2:
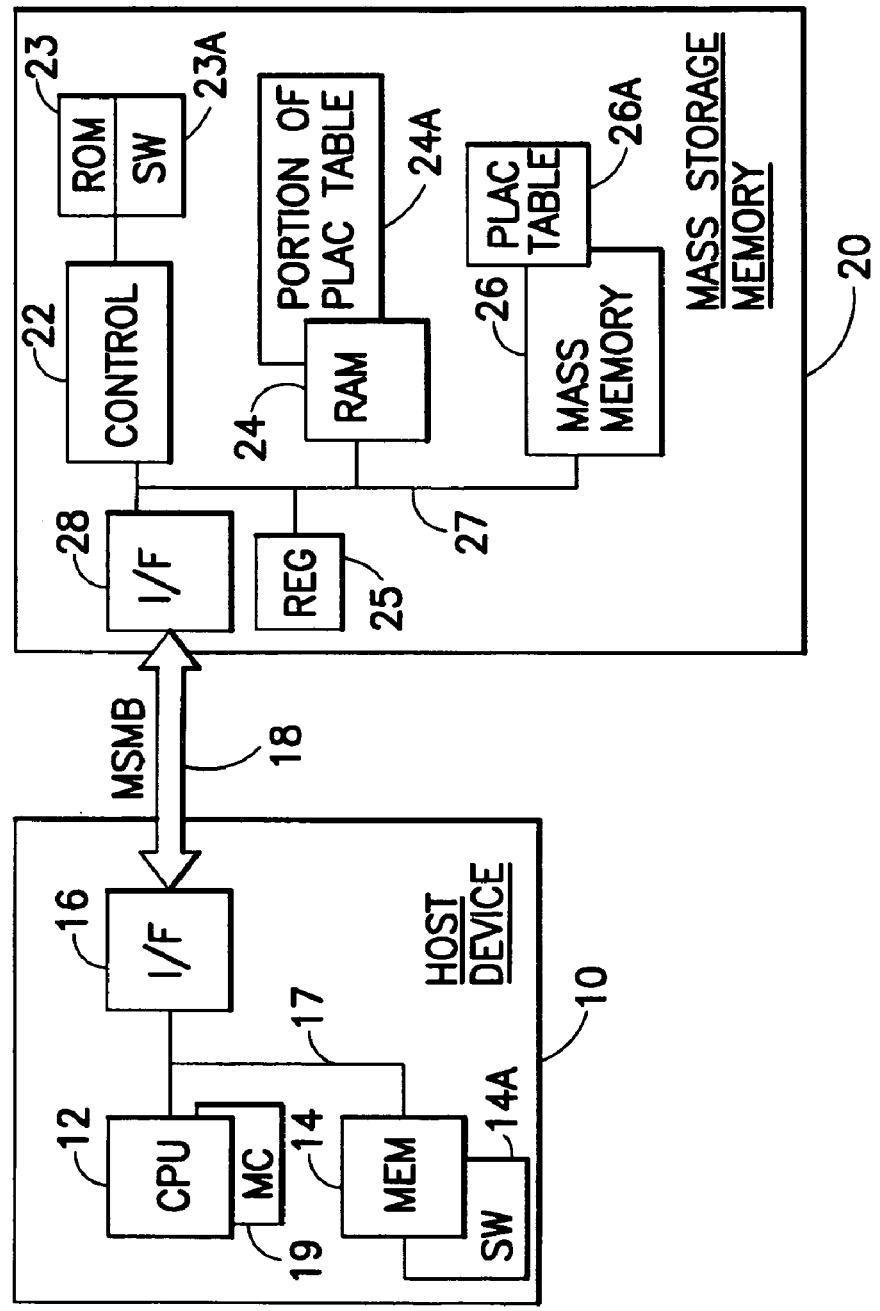
FIG. 2 is a simplified block diagram of a host device connected with a mass storage memory device, and is helpful in describing the exemplary embodiments of this invention.

Before further describing the exemplary embodiments of this invention reference is made to FIG. 2. FIG. 2 shows is a simplified block diagram of a host system or device 10 connected with a mass storage memory 20 via a mass storage memory bus (MSMB) 18. The MSMB 18 may be compatible with any suitable mass memory interface standard such as MMC or UFS, as two non-limiting examples. The MSMB 18 may include signal lines such as those shown in FIG. 1A for an eMMC embodiment. The host device 10 includes at least one data processor or controller, such as a CPU 12 that operates in accordance with stored program instructions. The program instructions (SW 14A) are stored in some suitable memory (MEM) 14 of the host 10. The CPU 12 is connected with the memory 14 and a MSMB interface (I/F) 16 via at least one internal bus 17. The MSMB interface 16 may include a memory controller (MC), or may be coupled with a MC unit 19 associated with the CPU 12. The host device 10 may be a computer, a cellular phone, a digital camera, a gaming device or a PDA, as several non-limiting examples. Note that the memory 14 may be any read-only or read/write memory or memory device, such as semiconductor memory or a disk-based memory as two non-limiting examples.

The mass storage memory 20 includes a data processor or microcontroller or, more simply, a controller 22 that is connected via at least one internal bus 27 with a RAM 24, which can be an embedded SRAM, an external DRAM, a non-volatile mass memory 26 (e.g., a multi-gigabyte flash memory mass storage) and a MSMB interface (I/F) 28. The controller 22 operates in accordance with stored program instructions or software (SW) 23A that can be stored in, for example, a ROM 23. The program instructions may also be stored in the RAM 24 or in the mass memory 26. The mass storage memory 20 may be embodied as an UFS, eMMC or a SD device, as non-limiting examples, and may be external to (plugged into) the host device 10 or installed within the host device 10.

For the purposes of describing the exemplary embodiment of this invention the mass storage memory 20, such as the non-volatile mass memory 26, can be assumed to store an entire physical-logical address conversion (PLAC) table 26A having some size M expressed in storage bytes or words. The RAM (e.g., SRAM) 24 can be assumed to store a "local", more readily accessible portion of the physical-logical address conversion (PLAC) table 24A having some size N expressed in storage bytes or words, where N<M. That is, the portion of the PLAC table 24A stored in the RAM 24 (assumed to have a significantly faster access speed than the mass memory (flash) 26) is smaller than the entire PLAC table 26A due to, for example, cost and/or power consumption criteria. In general, by "more readily accessible" what is meant is that the portion of the PLAC table 24A can be accessed at least more rapidly and/or in a manner that consumes less power than the entire PLAC table 26A.

Figure 3:
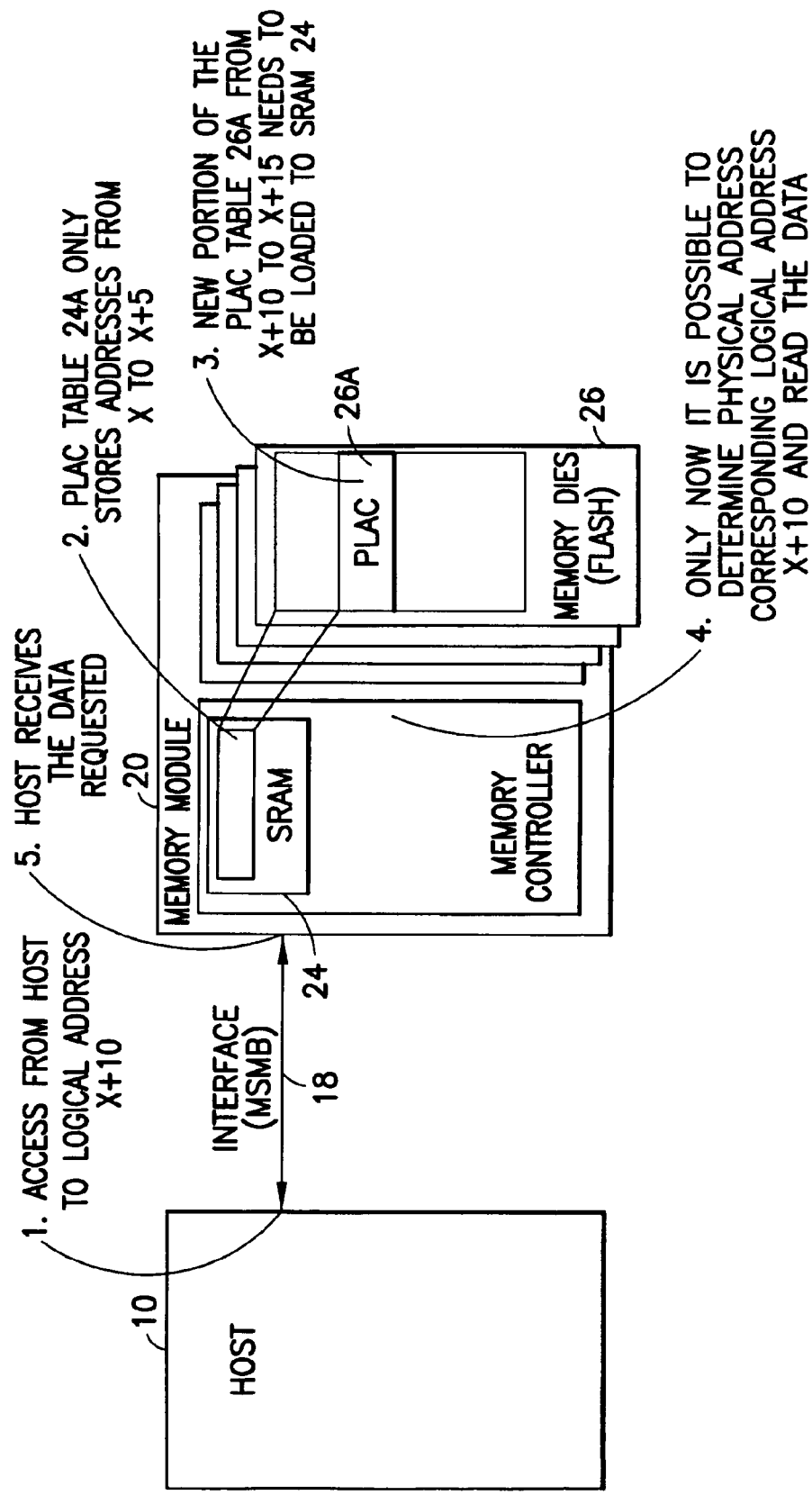
FIG. 3 shows an example of typical scenario in which an access to a mass storage memory (flash) necessitates loading a different portion of a physical-logical address conversion table to a local version of the table stored in flash controller RAM (e.g., SRAM).

FIG. 3 shows an example of typical scenario in which an access to the mass storage memory 20 necessitates loading a different portion of the PLAC 26A to the local PLAC table 24A in the SRAM 24. In this example the host 10 issues an access to logical address X+10, but the local PLAC table 24A only stores physical-logical address mapping data for addresses from X to X+5. In this case a new portion of the PLAC table 26A from, for example, X+10 to X+15 needs to be loaded to the SRAM 24. After the new portion is loaded the corresponding physical address in the flash 26 can be determined for the requested access and the requested data read and returned to the host 10. As can be appreciated, the need to reload the SRAM 24 requires time that can negatively impact the overall mass memory access speed and response.

It is pointed out that the embodiment depicted in FIGS. 2 and 3 is but one exemplary embodiment. For example, in some embodiments the PLAC table 26A could be stored in other than the non-volatile mass memory 26, such as some other non-volatile memory such as ROM, or it could be stored in RAM such as SRAM or DRAM, or it could be stored in a bank of registers. In a similar manner the portion of the PLAC table 24A can be stored in the SRAM 24 as shown, or it could be stored in some other memory of the mass storage device 20, including some other non-volatile memory (other than the mass memory 26), or in some other SRAM, or in a DRAM (or in a register bank). That is, the embodiment shown in FIGS. 2 and 3 should not be viewed as limiting in any manner the various forms in which the exemplary embodiments may be realized.

The exemplary embodiments of this invention make a reasonable assumption that a system is aware of its own memory map, and that through the use of, for example, program execution tracing and/or simulation it is possible to ascertain and record typical patterns related to accesses to the mass storage memory 20. For example, the operation of an operating system and/or one or more application software packages or modules of the host device 10 can be monitored to record memory accesses to the mass storage memory 20. Based on this information an estimate can be made as to which portion(s) of the physical-logical address conversion table 26A would be the most optimum to be located in the managed NAND memory device (e.g., in SRAM 24) by default. Even though different portions of the physical-logical address conversion table 26A are needed during run time, and are loaded to overwrite the current contents of the PLAC 24A, in accordance with an aspect of the exemplary embodiments of this invention it can be beneficial to periodically reload the default portion(s) of the physical-logical address conversion table 26A to the PLAC 24A. The reloading of the PLAC 24A can be initiated by the host 10 and/or by the mass memory device 10, e.g., based on at least one trigger condition being satisfied, as will be described in further detail below.

In a first exemplary embodiment of this invention the memory device 20 can include a register (REG) 25 indicating the size of the SRAM space(s) for the physical-logical address conversion table(s) 24A. The register 25 could be, for example, a hardware register associated with the controller 22, or it could be a reserved location or locations in the RAM 24, or the ROM 23, or the mass memory 26. In general, the register 25 can be considered simply to be a "memory element" of the mass memory storage device 20. The register 25 can store, for example, two parameters: the number of physical-logical address conversion tables 24A and the size of the table(s). It is thus within the scope the exemplary embodiments to provide two or more physical-logical address conversion tables 24A, where each has a different size, and where the size of each table 24A is indicated in the register 25. In a basic embodiment there can be one physical-logical address conversion table 24A stored in the RAM 24, and thus the register 25 simply indicates the size (number of storage locations of the RAM 24) of the one physical-logical address conversion table 24A.

Further in accordance with this first embodiment, a control command can be defined so that the host 10 can inform the memory device 20 of the default logical-physical address conversion range to be stored in the SRAM 24 by sending the at least one pre-determined default logical address range. In this context "pre-determined" can imply that the default logical address range is one that was previously established by some procedure (e.g., program execution monitoring and/or simulation). In this context "default" can imply what portion of physical-logical address conversion table 26A is to be stored in the physical-logical address conversion table 24A (in RAM 24) after, for example, power up, reset, defined delay and/or some other state change (e.g., after a low power sleep-standby mode is exited).

In one embodiment the host 10 can ignore the size register 25 in the memory 20 (whether or not it is actually present) and just send the preferred start address of the default logical address range to the mass storage memory 20 for establishing the default logical-physical address conversion range. While being a simple approach, in this case the host 10 may not be sure of how wide a range of memory addresses the memory device 20 actually supports.

In this exemplary embodiment the host 10 does not send an actual pre-determined default logical address range per se, but instead can send just a starting (initial) logical address. In response, the controller 22 of the memory device 20 can load the corresponding portion of the PLAC table 24A by using the starting logical address received from the host 10, and by considering the actual size allocated for the PLAC table 24A in the memory 24. It can be noted that for a case where the memory device 20 can establish/manage more than one PLAC table 24A, then the host 10 may send a corresponding number of starting logical addresses, and the controller 22 can subsequently load each PLAC table 24A with physical-logical address mapping data based on the starting logical addresses.

In another exemplary embodiment the host 10 can issue a command to read the size register 25. In this case the controller 22 of the memory 20 interprets the command and returns as at least one parameter the size information stored in the register 25, i.e., the size of the logical-physical address table 24A that is supported by the memory device 20. If more than one such table is supported, the controller 22 returns the number of supported tables as well as the size of each (if they differ). In response, the host 10 can select the logical address range in order to optimize the starting address of the default logical-physical address conversion range so that it matches in an optimum manner the expected typical accesses.

In a further exemplary embodiment the host 10 can send two or more logical address ranges in order to establish in the mass storage memory 20 separate and smaller default logical-physical address conversion ranges to be stored in a single logical-physical address conversion table 24A.

The setting of the default logical address range(s) can be accomplished during the host device manufacturing phase and can apply for the lifetime of the product (in which the host is embodied). For example, based on program tracing and/or simulation during the design/development of the host 10 the mass memory accesses are recorded, and the default logical address range(s) is pre-determined.

Alternatively, the setting of the default logical address range(s) may be changed during the lifetime of the host 10. For example, if the host 10 becomes aware that the typical accesses to the flash memory 20 (e.g., the most frequent ones) have changed for some reason, then the default logical address range(s) that define the setting of the default logical-physical address conversion range(s) in the mass memory device 20 can be changed accordingly. Such changes can occur, for example, due to an update to the SW 14A (e.g., due to an over-the-air (OTA) operating system (OS) software update if the host 10 is, or includes, a mobile phone). Such changes can also occur, for example, if some significant new application SW is installed in the host device 10.

Note that in this case the SW update package or the new/revised application program package can include as part of the package the revised settings that indicate a range or ranges of logical addresses for use by the mass storage memory 20 in determining the default logical-physical address conversion range(s).

In any of these cases the information that is descriptive of default logical address range(s) that is sent to the mass storage memory 20 from the host 10 can still be considered to be pre-determined in some fashion. In general, the information sent from the host 10 can be considered to be an indication of at least one default logical address range for the mass memory 26 of the mass storage memory device 20. The indication that is sent can specify one of the at least one default logical address range or a starting address of the at least one default logical address range.

In a further embodiment the memory device 20 can accomplish a revision to the default logical-physical address conversion range(s). For example, the controller 22 of the memory device 20 can track accesses made to the memory device 20 by the host 10 and can record statistics concerning the most frequent accesses to certain address range(s). These statistics can be used to, for example, modify default logical-physical address conversion range(s) that are based on logical addresses received from the host 10, or replace the default logical-physical address conversion range(s) that are based on logical addresses received from the host 10. In this case it is also within the scope of the exemplary embodiments to provide signaling between the host 10 and the memory 20 whereby the host 10 can query the memory 20 to determine if the originally established default logical-physical address conversion range(s) have been modified and/or replaced by the memory 20.

It is also within the scope of the exemplary embodiments to provide predefined algorithm(s), such as an incremental pre-fetch, which could be set by the host 10, and/or tracking of a most recent next logical address after the current access, and/or tracking of a most typical next logical address after the current address, as non-limiting examples, whereby certain settings can be controlled/set by the host 10 to affect the pre-loading of a next portion of the logical-physical conversion table 24A. This pre-loading function can execute as a background task while a current access is still being served.

For example, the incremental pre-fetch can come into play when the host 10 accesses the last logical address in the current portion of the PLAC table 24A in the RAM 24. In the incremental pre-fetch option the memory controller 22 pre-fetches the next portion of PLAC table in order (incremental address order) so that if/when the host 10 accesses the next logical address then the corresponding portion of the PLAC table 24A is already loaded and is ready to be accessed. As another embodiment, and if a statistical option is set, then the memory controller 22 can, for example, check to determine what has been the most typical next access after the current access. If the "typical" next access points outside of the current portion of the PLAC table 24A then the corresponding next most likely portion can be pre-fetched from the PLAC table 26A to the local portion of the PLAC table 24A in RAM (e.g., SRAM) 24.

It is within the scope of the exemplary embodiments that one or more conditions are established to trigger a re-load of the default logical-physical address conversion range(s) into the logical-physical address conversion table 24A. For example, one trigger condition can be to re-load of the default logical-physical address conversion range(s) each time that some other accesses have completed, e.g., each time some application terminates. Another trigger condition can be to re-load of the default logical-physical address conversion range(s) only when some specific control command is issued by the host 10. Another exemplary trigger condition can be to initiate a re-load of the default logical-physical address conversion range(s) when a power up/reset condition is detected by the memory device 20.

It can be noted that the re-load of the default logical-physical address conversion range(s) to the RAM 24 can be accomplished each time by the host 10 sending the pre-determined default logical address range(s) to the mass storage memory device 20. Alternatively, the controller 22 can save originally received indication(s) of the default logical address range(s), which can be just the starting address or addresses of the default logical address range or ranges, as explained above, and initiate the re-load based on a re-load command received from the host 10. It is also within the scope of the exemplary embodiments for the controller 22 to automatically initiate the re-load of the default logical-physical address conversion range(s) if it detects a re-load trigger condition being satisfied, such as a reset or an exit from a power-down mode to a full power mode of operation.

In general, in some embodiments of this invention the controller 22 of the mass storage memory device 20 can be constructed and operated to change the default loading and contents of the logical-physical address conversion table 24A based on, for example, re-load information received from the host 10, and/or based on a run-time command received from the host 10, and/or based on run-time mass memory 26 access statistics recorded by the controller 22. Thus, it should be appreciated that in some embodiments the mass storage memory device 20 can be configured to autonomously change the default contents of the logical-physical address conversion table 24A. In this case the above-mentioned signaling may be used to inform the host 10 of the change.

It is pointed out that in some exemplary embodiments of this invention the above described interactions of the mass storage memory 20 and the host 10 are not absolutely necessary. For example, the (default) portion of the PLAC table 26A to be initially loaded can be determined by the controller 22 without receiving information from the host 10. This default portion of the PLAC table 26A may be defined as a "factory setting", i.e., defined during the manufacturing phase. In this case the memory controller 22 loads the default portion of the PLAC table 26A according to the factory setting. In another exemplary case the memory controller 22 loads as the default portion of the PLAC table 26A that portion that points to beginning of the data storage region of the mass memory 26, i.e., starting from the first memory address of the data storage portion. In practice the default portion of the PLAC table 26A can be any pre-defined portion, with the point being that the default portion is known a priori by the memory controller 22 without receiving explicit information from the host 10.

It should be noted that the host 10 need not send information to the mass storage memory 20 each time that an applicable trigger condition occurs, e.g., each power-up cycle. That is, and more generally, the occurrence of a particular trigger condition need not automatically result in a re-load of the default logical-physical address conversion table(s) in the PLAC 24A.

There are a number of technical effects and advantages that can be realized by the use of these exemplary embodiments. For example, there can be a faster response to (random) accesses to the memory 20 by the host 10, an enhanced user experience, and an avoidance of "over" specifying the amount of SRAM 24 in the managed NAND memory device 20 which enables cost efficiencies to be realized, especially in low cost, mass marketed consumer products and systems.

Based on the foregoing it should be apparent that the exemplary embodiments of this invention provide a method, apparatus and computer program(s) to operate a host device with a mass storage memory device to at least increase the speed of memory accesses by ensuring that at least one physical-logical address conversion table contained in the mass storage memory device stores potentially the most relevant and useful physical-logical address conversion information.

Figure 4:
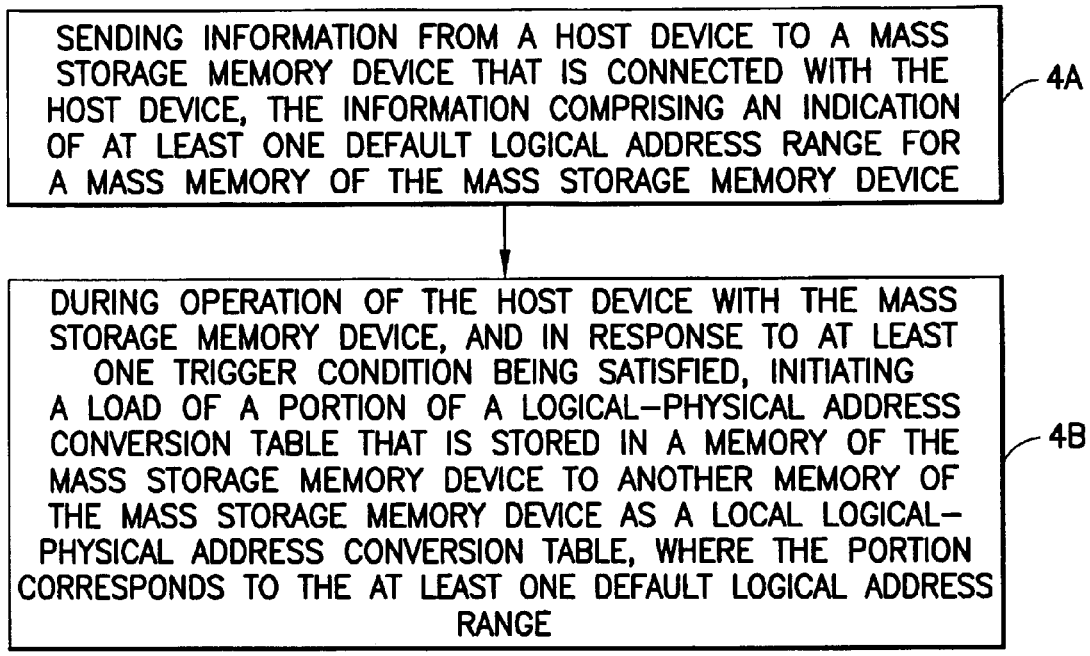
FIG. 4 is a logic flow diagram that illustrates the operation of a method, and a result of execution of computer program instructions embodied on a computer readable memory, in accordance with the exemplary embodiments of this invention.

FIG. 4 is a logic flow diagram that illustrates the operation of a method, and a result of execution of computer program instructions, in accordance with the exemplary embodiments of this invention. In accordance with these exemplary embodiments a method performs, at Block 4A, a step of sending information from a host device to a mass storage memory device that is connected with the host device, the information comprising an indication of at least one default logical address range for a mass memory of the mass storage memory device. At Block 4B there is a step, executed during operation of the host device with the mass storage memory device, and in response to at least one trigger condition being satisfied, of initiating a load of a portion of a logical-physical address conversion table that is stored in a memory of the mass storage memory device to another memory of the mass storage memory device as a local logical-physical address conversion table, where the portion corresponds to the at least one default logical address range.

In the method of FIG. 4, where the at least one default logical address range is a pre-determined logical address range, and where the indication specifies one of the at least one default logical address range or a starting address of the at least one default logical address range.

In the method of the preceding paragraph, where the at least one pre-determined default logical address range is modified based on at least one of a change in a software program and an installation of a new software program in the host device.

In the method of the preceding paragraphs, where the at least one pre-determined default logical address range is modified by a controller of the mass storage memory device during operation of the mass memory storage device.

In the method of the preceding paragraphs, further comprising receiving from the mass memory storage device at least one parameter that specifies at least a size of a portion of the another memory that is allocated to store the portion of the logical-physical address conversion table as the local logical-physical address conversion table, and where the information that is sent from the host device to the mass storage memory device is determined by the host device at least in part based on the at least one parameter that is received from the mass storage memory device.

In the method of the preceding paragraph, where the at least one parameter further specifies how many local logical-physical address conversion tables are stored in the mass memory storage device.

In the method of the preceding paragraph, where the at least one parameter further specifies a size of each of the local logical-physical address conversion tables that are stored in the mass memory storage device.

In the method of the preceding paragraphs, where the at least one trigger condition is comprised of at least one of power up, reset, a defined delay and a transition from a low power mode of operation to a higher power mode of operation.

Figure 5:
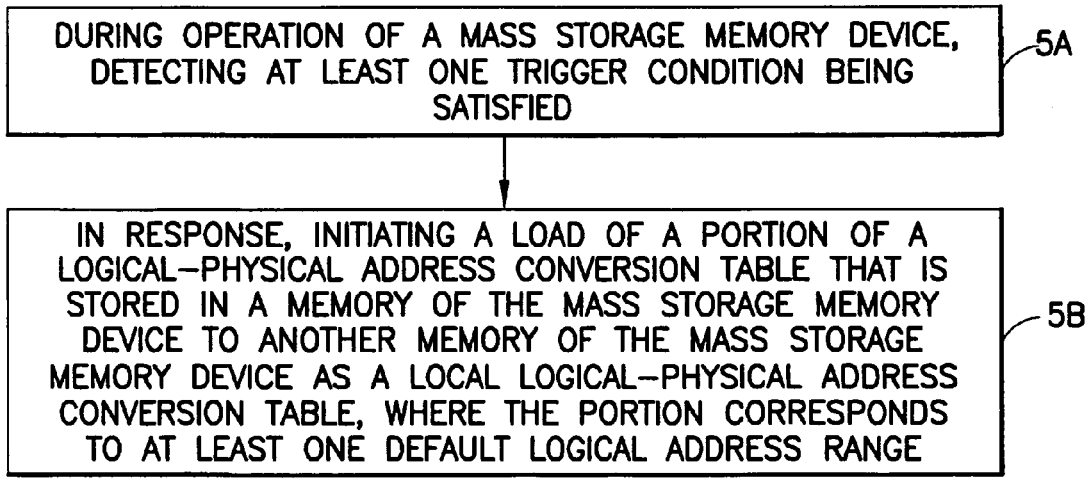
FIG. 5 is a logic flow diagram that illustrates the operation of a method, and a result of execution of computer program instructions embodied on a computer readable memory, further in accordance with the exemplary embodiments of this invention.

FIG. 5 is a logic flow diagram that illustrates the operation of a method, and a result of execution of computer program instructions, further in accordance with the exemplary embodiments of this invention. In accordance with these exemplary embodiments a method performs, at Block 5A, at step of detecting at least one trigger condition being satisfied and, at Block 5B, in response there is a step of initiating a load of a portion of a logical-physical address conversion table that is stored in a memory of the mass storage memory device to another memory of the mass storage memory device as a local logical-physical address conversion table, where the portion corresponds to at least one default logical address range.

In the method of the preceding paragraph, and further comprising receiving information at the mass memory storage device from a host device that is connected with the mass memory storage device, the information comprising an indication of the at least one pre-determined default logical address range for a mass memory of the mass storage memory device.

In the method of the preceding paragraphs, where the at least one pre-determined default logical address range is modifiable during operation of the mass memory storage device so as to enable the loading of a different portion of the logical-physical address conversion table to the another memory of the mass storage memory device as the local logical-physical address conversion table.

In the method of the preceding paragraphs, further comprising sending from the mass memory storage device at least one parameter that specifies at least a size of a portion of the another memory that is allocated to store the portion of the logical-physical address conversion table as the local logical-physical address conversion table.

In the method of the preceding paragraph, where the at least one parameter further specifies how many local logical-physical address conversion tables are stored in the mass memory storage device and a size of each of the local logical-physical address conversion tables that are stored in the mass memory storage device.

In the method of the preceding paragraphs, where the at least one trigger condition is comprised of at least one of power up, reset, a defined delay and a transition from a low power mode of operation to a higher power mode of operation.

In the method of the preceding paragraphs, where the mass storage memory device is configured to change the default loading and contents of the portion of the logical-physical address conversion table based on at least one of information received from the host device, a command received from the host device, and mass memory access statistics recorded by a controller of the mass storage memory device.

The exemplary embodiments also pertain to a non-transitory computer-readable medium that contains software program instructions, where execution of the software program instructions by at least one data processor results in performance of operations that comprise execution of the methods of FIGS. 4 and 5 and the foregoing several paragraphs that are descriptive of same.

The various blocks shown in FIGS. 4 and 5 may be viewed as method steps, and/or as operations that result from operation of computer program code, and/or as a plurality of coupled logic circuit elements constructed to carry out the associated function(s).

The exemplary embodiments thus also pertain to an apparatus having a processor and a memory including computer program code. The memory and computer program code are configured to, with the processor, cause the apparatus at least to send information from a host device to a mass storage memory device that is connected with the host device, the information comprising an indication of at least one default logical address range for a mass memory of the mass storage memory device. The memory and computer program code are further configured to, with the processor, cause the apparatus, during operation of the host device with the mass storage memory device, and in response to at least one trigger condition being satisfied, to initiate a load of a portion of a logical-physical address conversion table that is stored in a memory of the mass storage memory device to another memory of the mass storage memory device as a local logical-physical address conversion table, where the portion corresponds to the at least one default logical address range.

The exemplary embodiments thus also pertain to an apparatus having a processor and a memory including computer program code. The memory and computer program code are configured to, with the processor, cause the apparatus at least to, during operation of the mass storage memory device, and in response to at least one trigger condition being satisfied, initiate a load of a portion of a logical-physical address conversion table that is stored in a memory of the mass storage memory device to another memory of the mass storage memory device as a local logical-physical address conversion table, where the portion corresponds to at least one default logical address range.

The exemplary embodiments also pertain to an apparatus that comprises means for sending information from a host device to a mass storage memory device that is connected with the host device, the information comprising an indication of at least one default logical address range for a mass memory of the mass storage memory device. The apparatus further comprises means operable during operation of the host device with the mass storage memory device, and responsive to at least one trigger condition being satisfied, for initiating a load of a portion of a logical-physical address conversion table that is stored in a memory of the mass storage memory device to another memory of the mass storage memory device as a local logical-physical address conversion table, where the portion corresponds to the at least one default logical address range.

The exemplary embodiments also encompass an apparatus that comprises means, operable during operation of a mass storage memory device, for detecting at least one trigger condition being satisfied and means for initiating a load of a portion of a logical-physical address conversion table that is stored in a memory of the mass storage memory device to another memory of the mass storage memory device as a local logical-physical address conversion table, where the portion corresponds to at least one default logical address range.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, and also possibly baseband circuitry, radio frequency circuitry, audio circuitry, image capture/recording circuitry and/or network interface circuitry, as several non-limiting examples, depending on the nature and function of the host 10.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

The foregoing description has provided by way of exemplary and non-limiting examples a full and informative description of various methods, apparatus and computer program software for implementing the exemplary embodiments of this invention. However, various modifications and adaptations may become apparent to those skilled in the relevant arts in view of the foregoing description, when read in conjunction with the accompanying drawings and the appended claims. As but some examples, the use of other similar or equivalent types of flash memory, memory technologies and memory module architectures may be attempted by those skilled in the art. However, all such and similar modifications of the teachings of this invention will still fall within the scope of the embodiments of this invention.

Furthermore, some of the features of the exemplary embodiments of this invention may be used to advantage without the corresponding use of other features. As such, the foregoing description should be considered as merely illustrative of the principles, teachings and embodiments of this invention, and not in limitation thereof.

What is claimed is:

1. A method, comprising:
sending information from a host device to a mass storage memory device that is connected with the host device, the information comprising an indication of at least one default logical address range for a mass memory of the mass storage memory device; and
during operation of the host device with the mass storage memory device, and in response to at least one trigger condition being satisfied, initiating a load of a portion of a logical-physical address conversion table that is stored in a memory of the mass storage memory device to another memory of the mass storage memory device as a local logical-physical address conversion table, where the portion corresponds to the at least one default logical address range.

2. The method of claim 1, where the at least one default logical address range is a pre-determined logical address range, and where the indication specifies one of the at least one default logical address range or a starting address of the at least one default logical address range.

3. The method of claim 2, where the at least one pre-determined default logical address range is modified based on at least one of a change in a software program and an installation of a new software program in the host device.

4. The method as in claim 2, where the at least one pre-determined default logical address range is modified by a controller of the mass storage memory device during operation of the mass memory storage device.

5. The method as in claim 1, further comprising receiving from the mass memory storage device at least one parameter that specifies at least a size of a portion of the another memory that is allocated to store the portion of the logical-physical address conversion table as the local logical-physical address conversion table, and where the information that is sent from the host device to the mass storage memory device is determined by the host device at least in part based on the at least one parameter that is received from the mass storage memory device.

6. The method of claim 5, where the at least one parameter further specifies how many local logical-physical address conversion tables are stored in the mass memory storage device.

7. The method of claim 6, where the at least one parameter further specifies a size of each of the local logical-physical address conversion tables that are stored in the mass memory storage device.

8. The method as in claim 1, where the at least one trigger condition is comprised of at least one of power up, reset, a defined delay and a transition from a low power mode of operation to a higher power mode of operation.

9. A non-transitory computer-readable medium that contains software program instructions, where execution of the software program instructions by at least one data processor results in performance of operations that comprise execution of the method of claim 1.

10. An apparatus, comprising:
a processor; and
a memory including computer program code, where the memory and computer program code are configured to, with the processor, cause the apparatus at least to,
send information from a host device to a mass storage memory device that is connected with the host device, the information comprising at least one default logical address range for a mass memory of the mass storage memory device; and
during operation of the host device with the mass storage memory device, and in response to at least one trigger condition being satisfied, initiate a load of a portion of a logical-physical address conversion table that is stored in a memory of the mass storage memory device to another memory of the mass storage memory device as a local logical-physical address conversion table, where the portion corresponds to the at least one default logical address range.

11. The apparatus of claim 10, where the at least one default logical address range is a pre-determined logical address range, and where the indication specifies one of the at least one default logical address range or a starting address of the at least one default logical address range.

12. The apparatus of claim 11, where the at least one pre-determined default logical address range is modified based on at least one of a change in a software program and the installation of a new software program in the host device.

13. The apparatus as in claim 11, where the at least one pre-determined default logical address range is modified by a controller of the mass storage memory device during operation of the mass memory storage device.

14. The apparatus as in claim 10, further comprising controlling the processor to receive from the mass memory storage device at least one parameter that specifies at least a size of a portion of the random access memory that is allocated to store the portion of the logical-physical address conversion table as the local logical-physical address conversion table, and where the information that is sent from the host device to the mass storage memory device is determined by the host device at least in part based on the at least one parameter that is received from the mass storage memory device.

15. The apparatus of claim 14, where the at least one parameter further specifies how many local logical-physical address conversion tables are stored in the mass memory storage device.

16. The apparatus of claim 15, where the at least one parameter further specifies a size of each of the local logical-physical address conversion tables that are stored in the mass memory storage device.

17. The apparatus as in claim 10, where the at least one trigger condition is comprised of at least one of power up, reset, a defined delay and a transition from a low power mode of operation to a higher power mode of operation.

18. A method, comprising:
  during operation of a mass storage memory device, detecting at least one trigger condition being satisfied; and
  in response, initiating a load of a portion of a logical-physical address conversion table that is stored in a memory of the mass storage memory device to another memory of the mass storage memory device as a local logical-physical address conversion table, where the portion corresponds to at least one default logical address range.

19. The method as in claim 18, further comprising receiving information at the mass memory storage device from a host device that is connected with the mass memory storage device, the information comprising an indication of the at least one pre-determined default logical address range for a mass memory of the mass storage memory device.

20. The method as in claim 18, where the at least one pre-determined default logical address range is modifiable during operation of the mass memory storage device so as to enable the loading of a different portion of the logical-physical address conversion table to the another memory of the mass storage memory device as the local logical-physical address conversion table.

21. The method as in claim 18, further comprising sending from the mass memory storage device at least one parameter that specifies at least a size of a portion of the another memory that is allocated to store the portion of the logical-physical address conversion table as the local logical-physical address conversion table.

22. The method of claim 21, where the at least one parameter further specifies how many local logical-physical address conversion tables are stored in the mass memory storage device and a size of each of the local logical-physical address conversion tables that are stored in the mass memory storage device.

23. The method as in claim 18, where the at least one trigger condition is comprised of at least one of power up, reset, a defined delay and a transition from a low power mode of operation to a higher power mode of operation.

24. The method as in claim 19, where the mass storage memory device is configured to change the default loading and contents of the portion of the logical-physical address conversion table based on at least one of information received from the host device, a command received from the host device, and mass memory access statistics recorded by a controller of the mass storage memory device.

25. An apparatus, comprising:
  a processor; and
  a memory including computer program code, where the memory and computer program code are configured, with the processor, cause the apparatus at least to,
  during operation of the mass storage memory device, and in response to at least one trigger condition being satisfied, initiate a load of a portion of a logical-physical address conversion table that is stored in a memory of the mass storage memory device to another memory of the mass storage memory device as a local logical-physical address conversion table, where the portion corresponds to at least one default logical address range.

26. The apparatus as in claim 25, where said data processor is further configured to receive information at the mass memory storage device from a host device that is connected with the mass memory storage device, the information comprising the at least one pre-determined default logical address range for the mass memory of the mass storage memory device.

27. The apparatus as in claim 25, where the at least one pre-determined default logical address range is modifiable by said data processor during operation of the mass memory storage device so as to enable the loading of a different portion of the logical-physical address conversion table to the another memory of the mass storage memory device as the local logical-physical address conversion table.

28. The apparatus as in claim 26, further comprising a memory element configured to store at least one parameter that specifies at least a size of a portion of the another memory that is allocated to store the portion of the logical-physical address conversion table as the local logical-physical address conversion table, and where said data processor is configured to send the at least one parameter to the host device.

29. The apparatus as in claim 28, where the at least one parameter further specifies how many local logical-physical address conversion tables are stored in the mass memory storage device and a size of each of the local logical-physical address conversion tables that are stored in the mass memory storage device.

30. The apparatus as in claim 25, where the at least one trigger condition is comprised of at least one of power up, reset, a defined delay and a transition from a low power mode of operation to a higher power mode of operation.

31. The apparatus as in claim 25, where said data processor is configured to change the default loading and contents of the portion of the logical-physical address conversion table based on at least one of information received from the host device, a command received from the host device, and mass memory access statistics recorded by said data processor.

* * * * *